United States Patent
Hijikata (10) Patent No.: US 7,087,286 B2
(45) Date of Patent: *Aug. 8, 2006

(54) HONEYCOMB STRUCTURE AND ASSEMBLY THEREOF

(75) Inventor: Toshihiko Hijikata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 101 days.

This patent is subject to a terminal disclaimer.

(21) Appl. No.: 10/471,530

(22) PCT Filed: Mar. 7, 2002

(86) PCT No.: PCT/JP02/02107

§ 371 (c)(1),
(2), (4) Date: Sep. 11, 2003

(87) PCT Pub. No.: WO02/079618

PCT Pub. Date: Oct. 10, 2002

(65) Prior Publication Data

US 2004/0081848 A1    Apr. 29, 2004

(30) Foreign Application Priority Data

Mar. 29, 2001  (JP)  ............ 2001-95416

(51) Int. Cl.
*B32B 3/12* (2006.01)
*B01D 53/34* (2006.01)
*B01J 21/04* (2006.01)

(52) U.S. Cl. ............ 428/116; 422/177; 422/180; 502/439

(58) Field of Classification Search ............ 428/116, 428/117; 422/177, 179, 180, 181; 522/523, 522/490, 493
See application file for complete search history.

(56) References Cited

U.S. PATENT DOCUMENTS 4,335,783 A    6/1982  McBrayer et al.

(Continued)

FOREIGN PATENT DOCUMENTS

EP    0 361 883 A1    4/1990
EP    0 639 702 A1    2/1995

(Continued)

OTHER PUBLICATIONS

Suresh T. Gulati, "Strength and Thermal Shock Resistance of Segmented Wall-Flow Diesel Filters", SAE Technical Paper Series 860008, Feb. 24-28, 1986, pp. 11-18.

*Primary Examiner*—Jennifer C. McNeil
*Assistant Examiner*—Timothy M. Speer
(74) *Attorney, Agent, or Firm*—Oliff & Berridge, PLC (57) ABSTRACT

A honeycomb structure obtained by bonding, into one piece, a plurality of honeycomb segments (2) each having a plurality of passages (6) surrounded by cell walls and extending in the axial direction of the segment. In the honeycomb structure, a material A (3) having compressive elasticity is provided between a side surface (21) of at least one honeycomb segment [2(*a*)] not constituting the outermost peripheral surface (23) of the honeycomb structure (1) and a side surface of the honeycomb segment [(2(*b*)) adjacent thereto. A honeycomb structure assembly (8) obtained by providing a material B (5) having compressive elasticity on the outermost peripheral surface (23) of the honeycomb structure (1) in a compressed state and thereby compression-holding the resulting honeycomb structure in a metallic container (11). A honeycomb structure using materials having compressive elasticity (B) is resistant to breakage, and has superior durability and reliability, by reducing the thermal stress generated therein during use by a sharp temperature change of inflow gas, a local heat of reaction and a local heat of combustion.

16 Claims, 9 Drawing Sheets

U.S. PATENT DOCUMENTS 5,724,735 A       3/1998   Ickes et al.
5,782,089 A *     7/1998   Machida et al. ............... 60/299
5,866,079 A *     2/1999   Machida et al. ............ 422/179

FOREIGN PATENT DOCUMENTS

| EP | 0 643 204 A2 | 3/1995 |
| JP | B2 61-51240 | 11/1986 |
| JP | U 1-63715 | 4/1989 |
| JP | U 6-47620 | 6/1994 |
| JP | A 08-28246 | 1/1996 |
| JP | A 9-220480 | 8/1997 |
| JP | 2000-210517 | 2/2000 |
| JP | A 2000-210517 | 8/2000 |
| JP | 2000-279728 | * 10/2000 |
| WO | WO 94/16134 | 7/1994 |
| WO | WO 00/00702 | 1/2000 |

* cited by examiner

FIG. 14

HONEYCOMB STRUCTURE AND ASSEMBLY THEREOF

BACKGROUND

1. Technical Field

The present invention relates to a honeycomb structure used in, for example, a catalyst carrier utilizing a catalytic action, for use in an internal combustion engine, a boiler, a chemical reactor, a fuel cell reformer, etc., a filter for trapping fine particles present in an exhaust gas, and to an assembly thereof. More particularly, the present invention relates to a honeycomb structure that is resistant to breaks when exposed to a thermal stress during its use, as well as to an assembly thereof.

2. Background Art

Honeycomb structures are in use in, for example, a carrier for a catalyst having a catalytic action, for use in an internal combustion engine, a boiler, a chemical reactor, a fuel cell reformer, etc., and a filter for trapping fine particles present in an exhaust gas, particularly fine particles emitted from a diesel engine.

In a honeycomb structure used for such a purpose, a sharp temperature change of exhaust gas and local heating make non-uniform the temperature distribution inside the honeycomb structure, and there have been problems such as crack generation in the honeycomb structure and the like. When the honeycomb structure is used particularly as a filter for trapping a particulate matter in an exhaust gas emitted from a diesel engine, it is necessary to burn the fine carbon particles deposited on the filter to remove the particles and regenerate the filter and, in that case, high temperatures are inevitably generated locally in the filter; as a result, large thermal stress and cracks tend to be generated.

Hence, there have been proposed processes for producing a honeycomb structure by bonding a plurality of individual segments using an adhesive. For example, U.S. Pat. No. 4,335,783 discloses a process for producing a honeycomb structure that comprises bonding a large number of honeycomb parts using a discontinuous adhesive. Also, JP-B-61-51240 proposes a thermal-shock resistant rotary regenerative heat exchanger that is formed by extrusion molding a matrix segment of honeycomb structure made of a ceramic material; cutting the structure into segments; firing them; making smooth, by processing, the outer peripheral portion of a fired segment; coating the part subject to bonding of the resulting segment with a ceramic adhesive which turns, after firing, to have substantially the same chemical composition as the matrix segment and a difference in thermal expansion coefficient of 0.1% or less at 800° C.; and firing the coated segments. Also, SAE paper 860008 (1986) discloses a ceramic honeycomb structure obtained by bonding cordierite honeycomb segments with a cordierite cement. Further, JP-A-8-28246 discloses a ceramic honeycomb structure obtained by bonding honeycomb ceramic members with an elastic sealant made of at least a three-dimensionally intertwined inorganic fiber, an inorganic binder, an organic binder and inorganic particles.

Meanwhile, regulations for exhaust gas have become stricter and engines have come to have higher performances. As a result, in order to achieve an improvement in combustion conditions of an engine and an increase in purification ability of a catalyst, the temperature of exhaust gas has increased year by year. In this connection, a higher thermal shock resistance has come to be required for the honeycomb substrate. Therefore, even with honeycomb structures such as mentioned above, when a sharp temperature change of inflow gas takes place, and a local heat of reaction, a local heat of combustion, etc., becomes larger during use, it is possible that the thermal stress applied thereto may not be sufficiently relaxed, cracks may appear therein and, in an extreme case, for example, the honeycomb structure may begin to disintegrate and break into fine pieces due to vibration.

The present invention has been made in view of the above situation. It aims at providing a honeycomb structure which resists breakage, and accordingly has superior durability and reliability, by reducing the thermal stress generated therein during use by a sharp temperature change of inflow gas, a local heat of reaction and a local heat of combustion.

SUMMARY OF THE INVENTION

In a first aspect, the present invention provides a honeycomb structure obtained by bonding, into one piece, a plurality of honeycomb segments having a large number of passages surrounded by cell walls and extending in the axial direction of the segment, characterized in that a material A having compressive elasticity is provided between a side surface of at least one honeycomb segment that is not constituting the outermost peripheral surface of the honeycomb structure and a side surface of the honeycomb segment adjacent to the at least one honeycomb segment.

In this aspect, it is preferred that a material having compressive elasticity is provided at part or the whole of the space between two adjacent honeycomb segments constituting the outermost peripheral surface of the honeycomb structure. It is also preferred that the material A having compressive elasticity is a ceramic fiber-made mat, and it is further preferred that the ceramic fiber-made mat is a non-intumescent mat composed mainly of alumina or mullite. It is also preferable that the honeycomb structure of the first invention is used for purification of exhaust gas of an automobile, and it is further preferable that the honeycomb structure is used as a filter for trapping diesel particulate. In this aspect, it is also preferable that the main component of the honeycomb segment comprises (1) at least one kind of ceramic selected from the group consisting of silicon carbide, silicon nitride, cordierite, alumina, mullite, zirconia, zirconium phosphate, aluminum titanate, titania, and combinations thereof; and (2) Fe—Cr—Al, nickel, or a material comprising metallic Si and SiC.

In a second aspect, the present invention provides a honeycomb structure assembly obtained by providing a material B having compressive elasticity, on the outer peripheral portion of the above honeycomb structure in a compressed state, thereby compression-holding the honeycomb structure in a metallic container.

In the second aspect, the material B having compressive elasticity is preferably a ceramic fiber-made mat, further preferably a heat-intumescent mat containing vermiculite, more preferably a non-intumescent mat composed mainly of alumina or mullite. The honeycomb structure assembly is preferably a canned structure obtained by a stuffing method, a tourniquet method, a clamshell method or a swaging method. Further, the honeycomb structure assembly is preferably obtained by loading a catalyst on honeycomb segments and then accommodating the catalyst-loaded honeycomb segments in a metallic container. Alternatively, the honeycomb structure assembly is preferably obtained by accommodating honeycomb segments in a metallic container and then loading a catalyst on the honeycomb segments.

BRIEF DESCRIPTION OF THE DRAWINGS

FIG. 13(a) shows the honeycomb structure of Comparative Example 1; and 13(b) shows the honeycomb structure of Comparative Example 2.

DETAILED DESCRIPTION OF EMBODIMENTS

The honeycomb structure and the honeycomb structure assembly of the present invention are described in detail below with reference to the accompanying drawings. However, the present invention is not restricted to the following embodiment. Incidentally, in the following, "section" refers to a section vertical to the direction of passage unless otherwise specified.

Figure 1A:
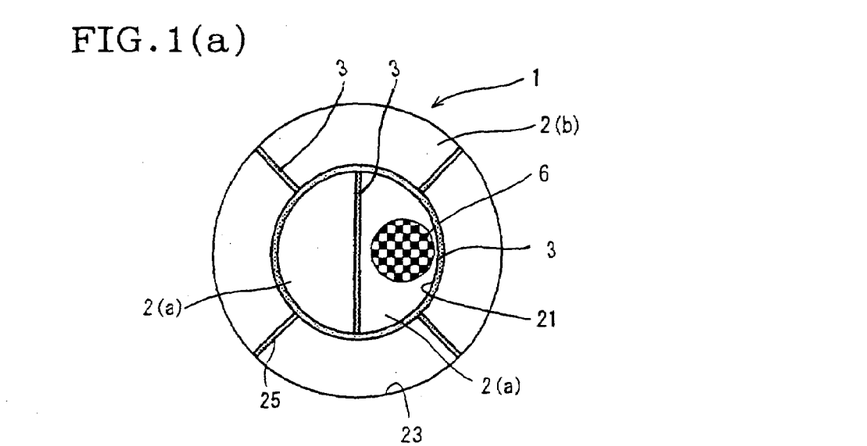
FIG. 1(a) is a schematic top view showing one embodiment of the honeycomb structure of the present invention.

FIG. 1(a) is a schematic top view showing one embodiment of the honeycomb structure of the present invention. The honeycomb structure 1 of the present invention shown in FIG. 1(a) is constituted by bonding, into one piece, four honeycomb segments 2(b) and two honeycomb segments 2(a), all having a large number of passages 6 surrounded by cell walls and extending in the axial direction of the honeycomb segment, wherein as a material A having compressive elasticity, a ceramic fiber-made mat 3 is provided between the side surfaces of each two adjacent honeycomb segments 2(a) and/or 2(b).

The important characteristic of the present invention is that the honeycomb structure 1 is constituted so that a material A having compressive elasticity is provided between the side surface 21 of the honeycomb segment 2(a) that is not constituting the outermost peripheral surface 23 of the honeycomb structure 1 and the side surface of the honeycomb segment 2(b) adjacent thereto. Having such a constitution, the honeycomb structure of the present invention absorbs displacements of honeycomb segments 2(a) and 2(b), which occur during the use of the honeycomb structure due to a sharp temperature change of inflow gas, a local heat of reaction, a local heat of combustion, etc.; as a result, the thermal stress generated in the honeycomb structure 1 decreases, breakage of the honeycomb structure 1 is preventable, and also the use of honeycomb structure at higher temperature environment is possible; thus, a honeycomb structure having durability, reliability and also high performance has been made possible.

Figure 1B:
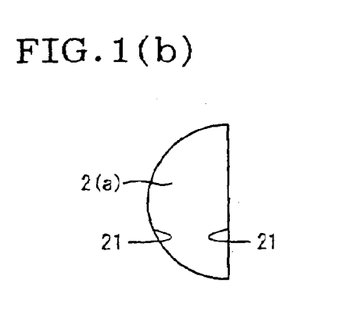
FIGS. 1(b) and 1(c) are each a schematic top view of a honeycomb segment(s).
Figure 1C:
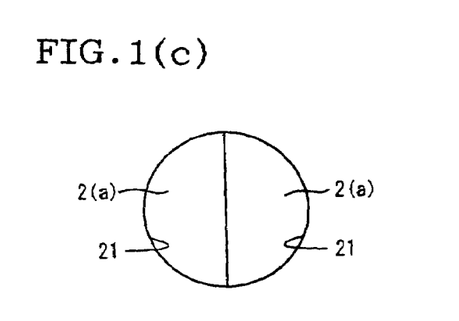

In the present invention, "at least one honeycomb segment that is not constituting the outermost peripheral surface of the honeycomb structure" means, in, for example, FIG. 1(a), one or two honeycomb segments 2(a) that is not constituting the outermost peripheral surface 23 of the honeycomb structure 1. When the honeycomb segment not constituting the outermost peripheral surface 23 is only one honeycomb segment 2(a), its side surface is a side 21 of a half-cylinder shown in FIG. 1(b); when the honeycomb segment not constituting the outermost peripheral surface 23 is two honeycomb segments 2(a), their side surface is a side 21 of a cylinder shown in FIG. 1(c). Therefore, in the case shown in FIG. 1(b), when a ceramic fiber-made mat 3 is provided on the side 21 of a half-cylinder, the same ceramic fiber-made mat 3 may be provided or an adhesive may be used for bonding without using the ceramic fiber-made mat 3 between other side surfaces. In the case shown in FIG. 1(c), when a ceramic fiber-made mat 3 is provided on the side 21 of a cylinder, the same ceramic fiber-made mat 3 may be provided or an adhesive may be used for bonding without providing the ceramic fiber-made mat 3 between other side surfaces. Preferably, as shown in FIG. 1(a), the same ceramic fiber-made mat 3 is provided also at the spaces between the side surfaces 25 of two adjacent honeycomb segments 2(b) constituting the outermost peripheral surface of the honeycomb structure 1.

In the present invention, the material A having compressive elasticity is preferred to have heat resistance and cushioning. As the compressive elasticity material A having heat resistance and cushioning, there is a non-intumescent material containing substantially no vermiculite or a low-intumescent material containing a small amount of vermiculite. Such a material is preferred to contain, as a main component, a ceramic fiber made of at least one kind selected from the group consisting of alumina, high alumina, silicon carbide, silicon nitride, zirconia and titania, or of a composite thereof. Further, the material A having compressive elasticity is preferred to be a mat made of such a fiber, and the ceramic fiber-made mat is preferred to be a non-intumescent mat composed mainly of alumina or mullite. Further preferably, these ceramic-made mats have a sealing property for preventing the leakage of to-be-treated fluid. Preferred specific examples of the material A having compressive elasticity are 1100HT™ produced by 3M Co. and Maftec™ produced by Mitsubishi Chemical Corporation.

In the present invention, each honeycomb segment 2 is preferred to contain, as a main component, (1) at least one kind of ceramic selected from the group consisting of silicon carbide, silicon nitride, cordierite, alumina, mullite, zirconia, zirconium phosphate, aluminum titanate, titania and combinations thereof; and (2) Fe—Cr—Al, nickel; or metallic Si and SiC, from the standpoints of the strength, heat resistance, etc. In the present invention, "main component" means a substance which is 80% by mass or more of all components and which becomes a main crystalline phase.

The cell density (the number of passages per unit sectional area) of the honeycomb segment 2 is preferably 0.9 to 310 cells/cm$^2$ (6 to 2,000 cells/in.$^2$). When the cell density is less than 0.9 cell/cm$^2$, the geometrical surface area is insufficient. When the cell density is more than 310 cells/cm$^2$, the pressure loss is too large. The sectional shape (cell shape) of the passage of the honeycomb segment 2 is preferably any of a triangle, a tetragon and a hexagon from the standpoint of production.

The section of the honeycomb segment 2 has at least one side of preferably 30 mm or more, more preferably 50 mm or more, most preferably 70 mm or more from the standpoint of providing the material A having compressive elasticity in standpoint of production.

Figure 2:
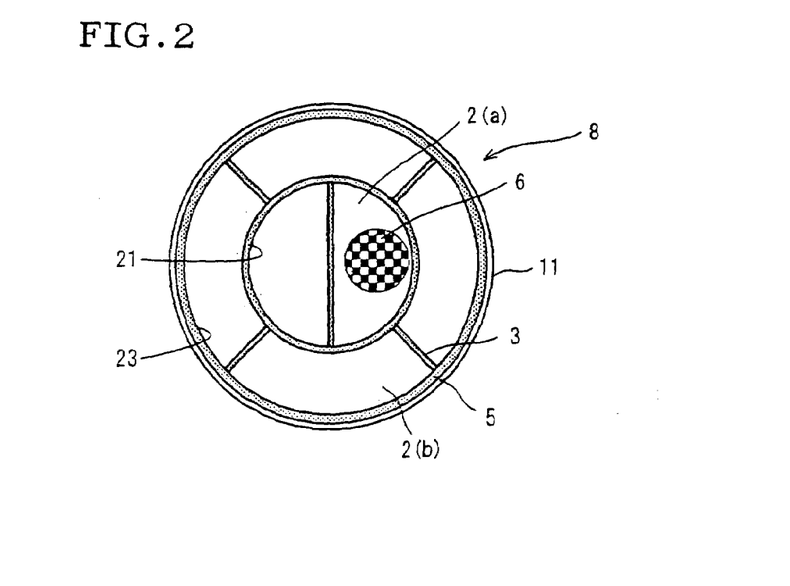
FIG. 2 is a schematic top view showing one embodiment of the honeycomb structure assembly of the present invention.

FIG. 2 is a schematic top view of a honeycomb structure assembly 8 obtained by holding a honeycomb structure shown in FIG. 1, in a metallic container 11. The honeycomb structure assembly 8 of the present invention, shown in FIG. 2, is obtained by providing a material B having compressive elasticity, on the outer peripheral portion of a honeycomb structure 1 in a compressed state and thereby compression-holding the honeycomb structure 1 in a metallic container 11.

In the present invention, the material B having compressive elasticity is preferred to have heat resistance and cushioning, similarly to the above-mentioned material A having compressive elasticity, and is further preferred to have a sealing property. The material B having compressive elasticity may be a non-intumescent material or an intumescent material. The material B having compressive elasticity is preferred to be, for example, a ceramic fiber composed mainly of at least one kind selected from the group consisting of alumina, high alumina, mullite, silicon carbide, silicon nitride, zirconia and titania, or of a composite thereof, and is further preferred to be a mat made of such a fiber. Specifically, there can be used, for example, 1100HT™ produced by 3M Co. and Maftec™ produced by Mitsubishi Chemical Corporation, both mentioned above. There can also be used, for example, Interlam Mat™ produced by 3M Co. (an intumescent mat).

Figure 3:
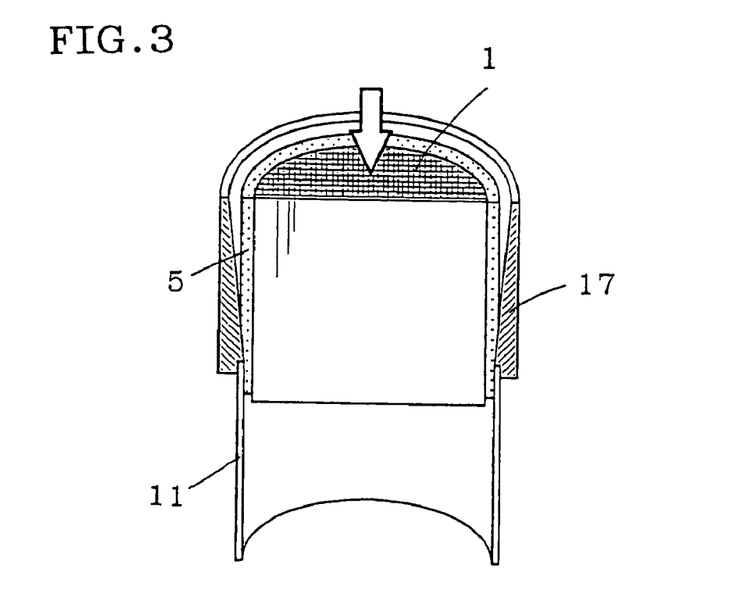
FIG. 3 is a partially cut-away view showing one example of the stuffing method used for stuffing a honeycomb structure in a metallic container.
Figure 4:
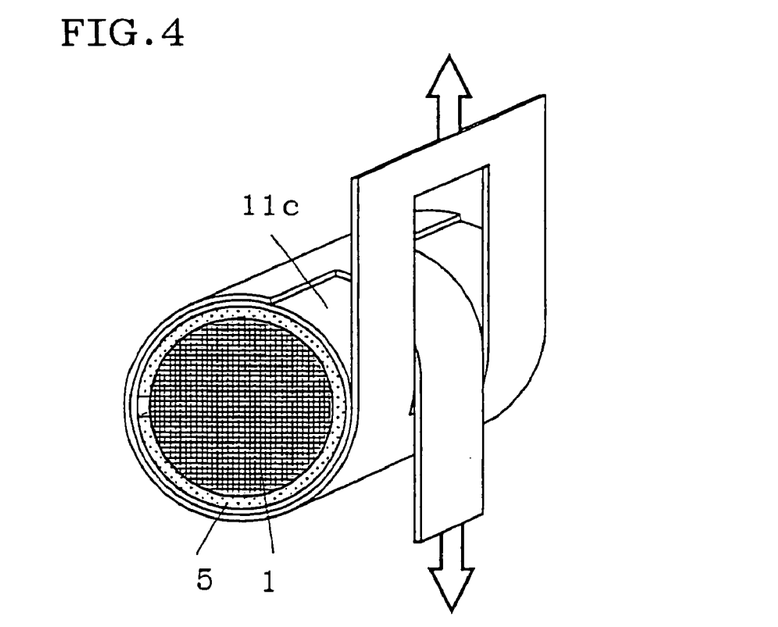
FIG. 4 is a perspective view showing one example of the tourniquet method used for accommodating a honeycomb structure in a metallic container.
Figure 5:
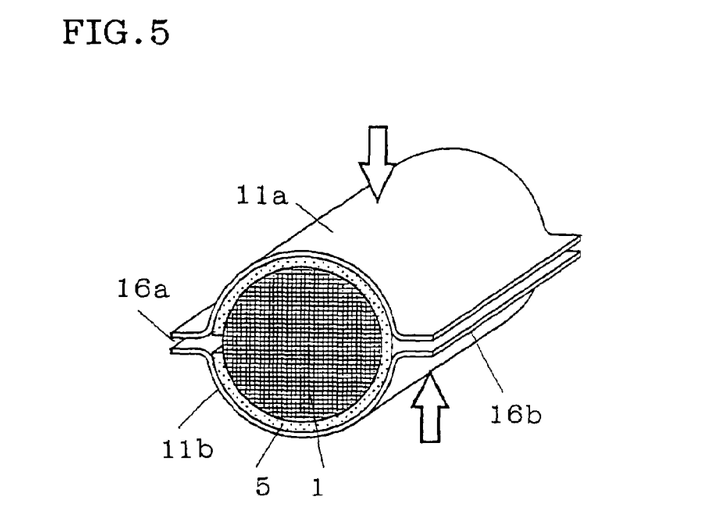
FIG. 5 is a perspective view showing one example of the clamshell method used for accommodating a honeycomb structure in a metallic container.
Figure 6:
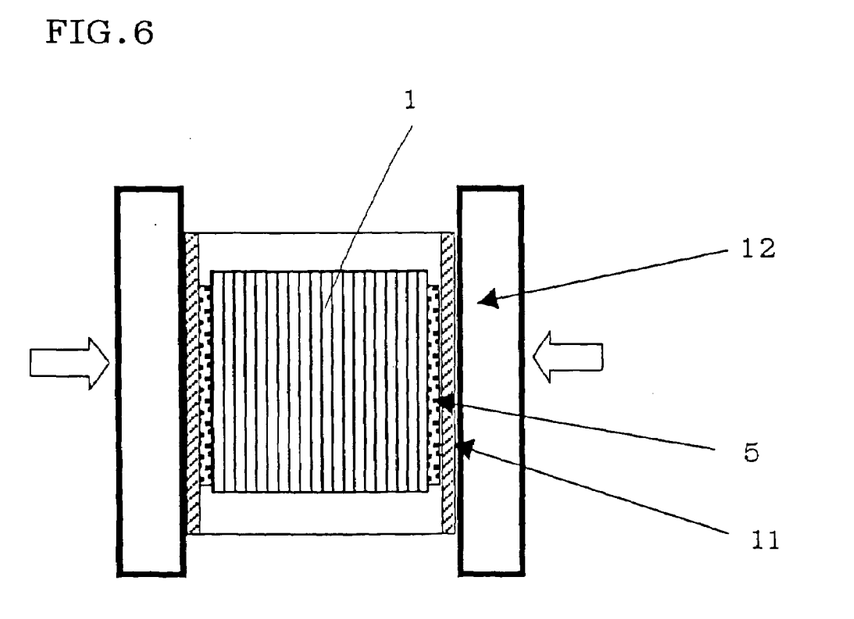
FIG. 6 is a sectional view parallel to the direction of passage, showing one example of the swaging method used for accommodating a honeycomb structure in a metallic container.
Figure 7:
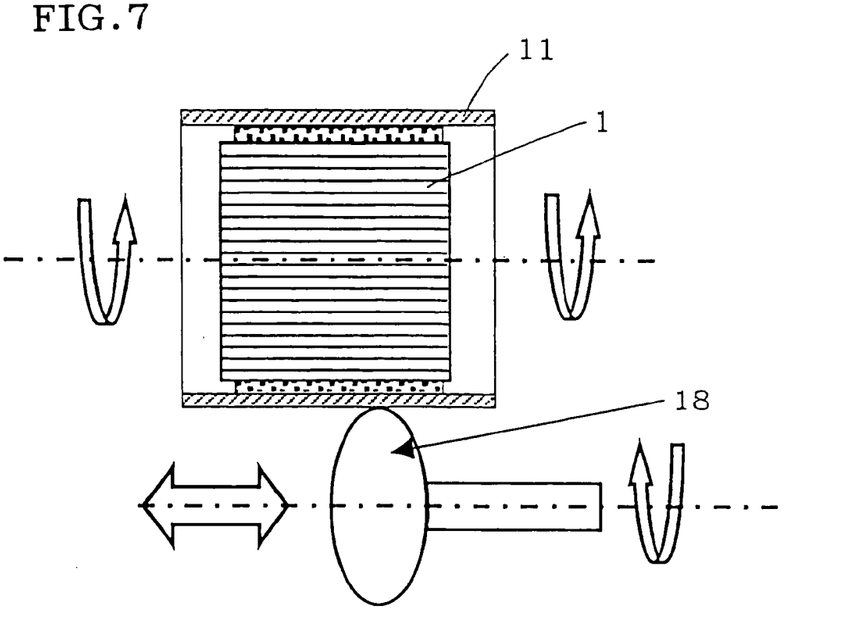
FIG. 7 is a sectional view parallel to the direction of passage, showing one example of the swaging method used for accommodating a honeycomb structure in a metallic container.

In the present invention, as the method for accommodating a honeycomb structure 1 and a material B (5) having compressive elasticity in a metallic container 11 in a compressed state, there are suitably used a stuffing method shown in FIG. 3, using a guide 17; a tourniquet method shown in FIG. 4, which comprises winding a metallic plate 11c around a honeycomb structure, pulling the plate to impart a pressure to the outermost surface of the honeycomb structure, and welding and fixing the to-be-jointed areas of the metallic plate 11c; and a clamshell method shown in FIG. 5, which comprises interposing a honeycomb structure 1 between two metallic container parts 11a and 11b while applying a load to the parts 11a and 11b, and welding the to-be-bonded areas (flanges) 16a and 16b of the parts 11a and 11b to obtain a integrated container. There is also suitably used a method (a swaging method) utilizing metal forming technology, shown in FIG. 6, which comprises applying a compression force to a metallic container 11 from the outside via a tap (of pressure type) 12 to squeeze the outer diameter of the metallic container 11. There can also be used a method shown in FIG. 7, which comprises squeezing, by metal forming process, the outermost surface of a metallic container 11 using a processing jig 18 with the metallic container 11 being rotated, that is, a method which comprises squeezing the outer diameter of a metallic container by rotary forging and thereby imparting a pressure to the outermost surface of a honeycomb structure accommodated in the metallic container.

When the honeycomb structure or honeycomb structure assembly of the present invention is used as a carrier for catalyst in an internal combustion engine, a boiler, a chemical reactor, a fuel cell reformer, or the like, the honeycomb segments used therein are allowed to load thereon a metal having a catalytic activity. As representative metals having a catalytic activity, there are mentioned Pt, Pd, Rh, etc. It is preferred that at least one kind of these is loaded on the honeycomb segments.

Meanwhile, when the honeycomb structure or honeycomb structure assembly of the present invention is used as a filter for trapping and removing the particulate matter contained in an exhaust gas, for example, as a diesel particulate filter (DPF), it is preferred that the cells of honeycomb structure are plugged alternately at each end and the cell walls of honeycomb structure are used as a filter.

When an exhaust gas containing a particulate matter is taken into a honeycomb structure constituted by honeycomb segments, from its one end face, the exhaust gas enters the inside of the honeycomb structure from those holes not plugged at the one end face, passes through porous cell walls having a filtration ability, and is discharged from the holes not plugged at the other end. The particulate matter is trapped by the cell walls at the time of its passing through the cell walls.

As the amount of particulate matter trapped and deposited on cell walls increases, an increase in pressure loss takes place rapidly, a load to engine increases, fuel consumption and drivability deteriorate; hence, the deposited particulate matter is burnt and removed periodically by a heating means such as heater or the like, to regenerate the ability of the filter. In order to promote the combustion during the regeneration, it is possible to load, on the honeycomb structure, the above-mentioned metal having a catalyst activity.

In the present invention, in order to load a catalyst on a honeycomb structure assembly 8, there can be used a method which comprises holding a honeycomb structure 1 in a metallic container 11 prior to catalyst loading, to form a honeycomb structure assembly 8, and then loading a catalyst on the honeycomb structure 1. According to this method, the risk of chipping-off or breakage of honeycomb structure during catalyst loading can be prevented. It is also preferred that when the honeycomb structure or honeycomb structure assembly of the present invention is used as a catalytic converter, a catalyst component is loaded on a honeycomb segment 2, then a honeycomb structure 1 is formed, and the structure is accommodated and held in a metallic container 11.

The present invention is described in more detail below by way of Examples. However, the present invention is not restricted to these Examples.

Incidentally, each of the following honeycomb structures of Examples and Conventional Examples (Comparative Examples) is a filter used for trapping diesel particulate, which is made of silicon carbide and has a cell wall thickness of 0.38 mm and a cell density (the number of passage per unit sectional area) of 31 cells/cm² and wherein the passages are plugged alternately at each end face of the honeycomb structure and the cell walls function as a filter.

EXAMPLE 1

A silicon carbide powder was used as a raw material. Thereto were added methyl cellulose, hydroxypropoxyl methyl cellulose, a surfactant and water to prepare a plastic material. This puddle (mud) was subjected to extrusion molding, and the resulting extrudate was dried using a microwave and hot air.

Figure 8:
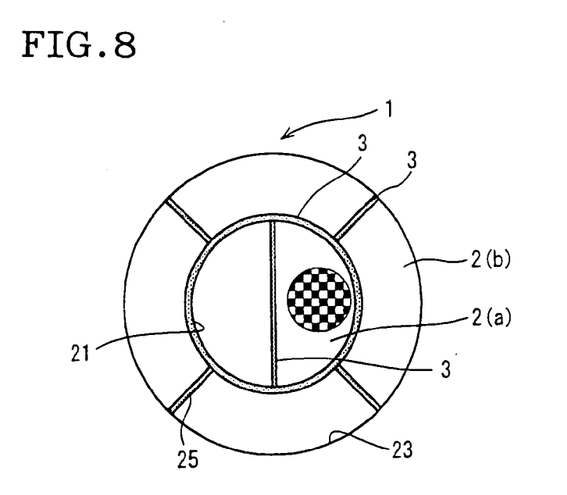
FIG. 8 is a schematic top view of the honeycomb structure produced in Example 1.

Then, the passages of the extrudate were plugged alternately at each end face of the extrudate with a sealant made of the same material as for the honeycomb structure to be obtained, in such a way that each end face of extrudate had a checkerboard pattern appearance. Then, the resulting material was heated for debindering in a $N_2$ atmosphere and then fired in an Ar atmosphere to obtain four honeycomb segments 2(b) having an outer diameter of 144 mm, an inner diameter of 73 mm and a length of 152 mm and two half-cylindrical honeycomb segments 2(a) having a diameter of 72 mm and a length of 152 mm. These six honeycomb segments 2(a) and 2(b) were bonded into one piece by providing a ceramic fiber-made non-intumescent mat 3 on the side surfaces 21 of the honeycomb segments 2(a) and between the side surfaces 25 of each two adjacent honeycomb segments 2(b) and using a double sided tape, to obtain a honeycomb structure 1. The same ceramic fiber-made non-intumescent mat as mentioned above was wound around the outermost peripheral surface 23 of the honeycomb structure 1; the resulting material was stuffed in a SUS 409-made metallic container using a tapered jig (a guide), to compression-fix the segments to each other and also the honeycomb structure to the metallic container, to obtain a cylindrical honeycomb structure assembly having a diameter of 144 mm and a length of 152 mm.

EXAMPLE 2

Figure 9A:
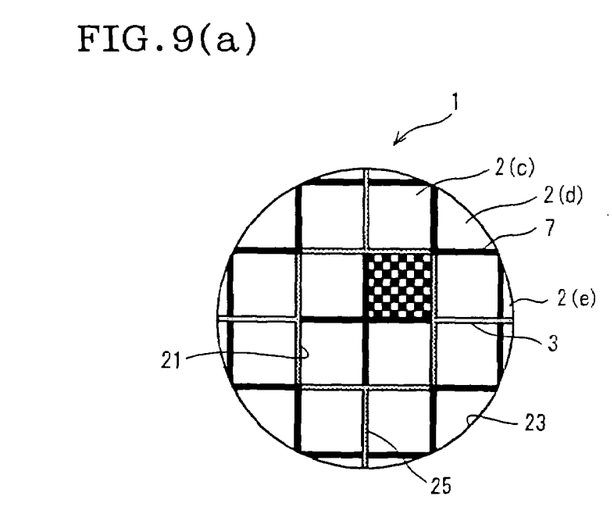
FIG. 9(a) is a schematic top view of the honeycomb structure produced in Example 2.
Figure 9B:
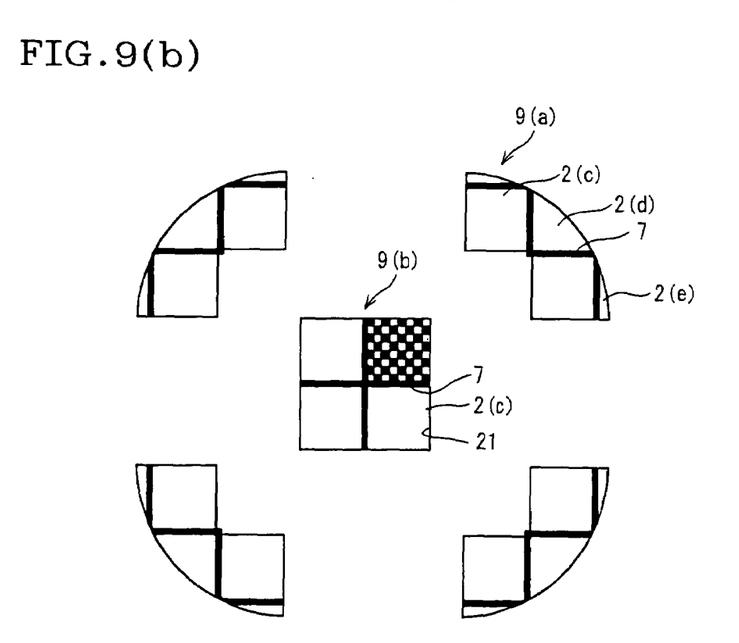
FIG. 9(b) is a schematic top view of a bonded honeycomb segment.

The five honeycomb segments in total produced in the same manner as in Example 1 as shown in FIG. 9(b), i.e. two quadratic prism-shaped honeycomb segments 2(c) having a size of 30 mm×30 mm×152 mm, one honeycomb segment 2(d) and two honeycomb segments 2(e), were bonded using an adhesive 7 which was a mixture of colloidal silica, an alumina fiber and water, followed by drying, to produce four bonded honeycomb segments 9(a). Similarly, four quadratic prism-shaped honeycomb segments 2(c) having a size of 30 mm×30 mm×152 mm were bonded using an adhesive 7 which was a mixture of colloidal silica, an alumina fiber and water, followed by drying, to produce one bonded honeycomb segment 9(b), which does not constitute the outermost peripheral surface of the honeycomb structure. Then, the four bonded honeycomb segments 9(a) and the one bonded honeycomb segment 9(b) were bonded into one piece by providing a ceramic fiber-made non-intumescent mat 3 on the side surface 21 of the bonded honeycomb segment 9(b) and between the surfaces 25 of each two adjacent bonded honeycomb segments 9(a) and using a double sided tape, to obtain a honeycomb structure 1 shown in FIG. 9(a). The same ceramic fiber-made non-intumescent mat as mentioned above was wound around the outermost peripheral surface 23 of the honeycomb structure 1; the resulting material was stuffed in a SUS 409-made metallic container using a tapered jig, to compression-fix the segments to each other and also the honeycomb structure to the metallic container, to obtain a cylindrical honeycomb structure assembly having a diameter of 144 mm and a length of 152 mm.

EXAMPLE 3

Figure 10A:
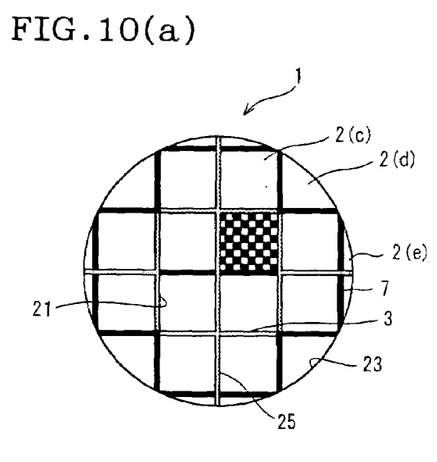
FIG. 10(a) is a schematic top view of the honeycomb structure produced in Example 3.
Figure 10B:
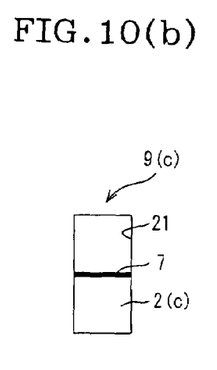
FIG. 10(b) is a schematic top view of a bonded honeycomb segment.

Four bonded honeycomb segments 9(a) were produced in the same manner as in Example 2. Two quadratic prism-shaped bonded honeycomb segments 9(c) having a size of 30 mm×60 mm×152 mm, shown in FIG. 10(b), were produced by bonding two quadratic prism-shaped honeycomb segments 2(c) having a size of 30 mm×30 mm×152 mm using an adhesive 7 which was a mixture of colloidal silica, an alumina fiber and water, followed by drying the bonded material. These six bonded honeycomb segments 9(a) and 9(c) were bonded into one piece by providing a ceramic fiber-made non-intumescent mat 3 on the side surfaces 21 of the bonded materials 9(c) and at the space between the side surfaces 25 of each two adjacent bonded materials 9(a) and using a double sided tape, to obtain a honeycomb structure 1 show in FIG. 10(a). The same ceramic fiber-made non-intumescent mat as mentioned above was wound around the outermost peripheral surface 23 of the honeycomb structure 1; the resulting material was stuffed in a SUS 409-made metallic container using a tapered jig, to compression-fix the segments to each other and also the honeycomb structure to the metallic container, to obtain a cylindrical honeycomb structure assembly having a diameter of 144 mm and a length of 152 mm.

EXAMPLE 4

Figure 11A:
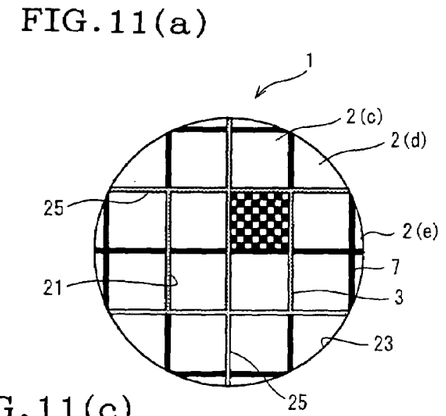
FIG. 11(a) is a schematic top view of the honeycomb structure produced in Example 4.
Figure 11B:
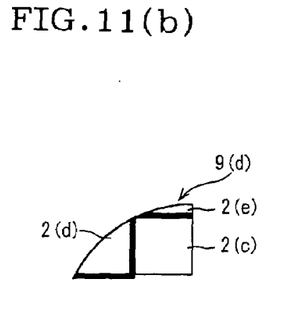
FIG. 11(b) and 11(c) are each a schematic top view of respective bonded honeycomb segments.
Figure 11C:
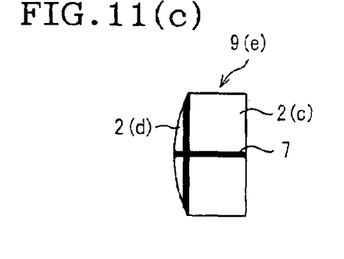

Two bonded honeycomb segments 9(c) were produced in the same manner as in Example 3. Four bonded honeycomb segments 9(d) shown in FIG. 11(b) were produced by bonding a total of three honeycomb segments, i.e., one honeycomb segment 2(c), one honeycomb segment 2(d) and one honeycomb segment 2(e) using an adhesive 7 and then drying the bonded material. Two bonded honeycomb segments 9(e) were produced by bonding two honeycomb segments 2(c) and two honeycomb segments 2(e) using an adhesive 7 and then drying the bonded material. Then, the two bonded materials 9(c), the four bonded materials 9(d) and the two bonded materials 9(e) were bonded into one piece by providing a ceramic fiber-made non-intumescent mat 3 on the side surfaces 21 of the bonded materials 9(c), at the space between the surfaces 25 of each two adjacent bonded materials 9(d) and at the space between the side surfaces 25 of 9(d) and 9(e), and using a double sided tape, to obtain a honeycomb structure 1 shown in FIG. 11(a). The same ceramic fiber-made non-intumescent mat as mentioned above was wound around the outermost peripheral surface 23 of the honeycomb structure 1; the resulting material was stuffed in a SUS 409-made metallic container using a tapered jig, to compression-fix the segments to each other and also the honeycomb structure to the metallic container, to obtain a cylindrical honeycomb structure assembly having a diameter of 144 mm and a length of 152 mm.

EXAMPLE 5

Figure 12A:
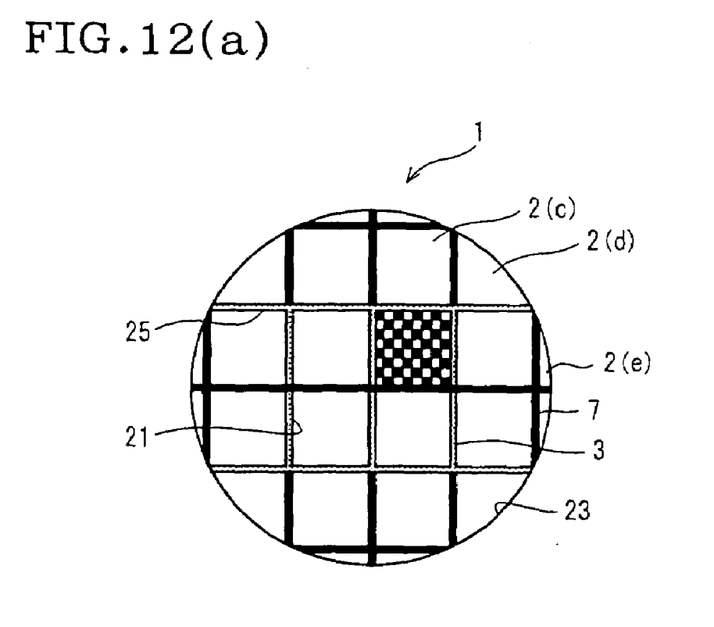
FIG. 12(a) is a schematic top view of the honeycomb structure produced in Example 5.
Figure 12B:
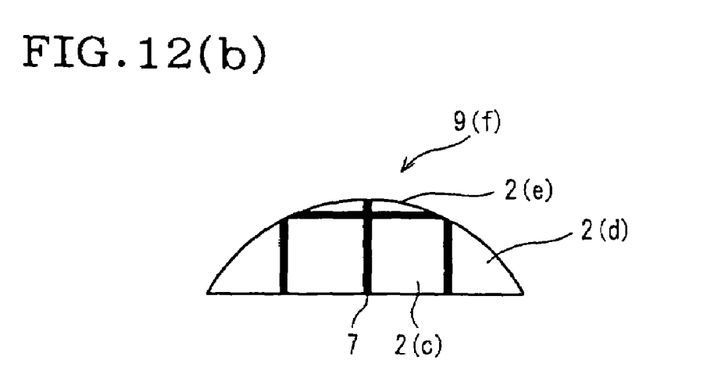
FIG. 12(b) is a schematic top view of a bonded honeycomb segment.

Two bonded honeycomb segments 9(c) and two bonded honeycomb segments 9(e) were produced in the same manner as in Example 4. Two bonded honeycomb segments 9(f) shown in FIG. 12(b) were produced by bonding a total of six honeycomb segments, i.e., two honeycomb segments 2(c), two honeycomb segments 2(d) and two honeycomb segments 2(e), using an adhesive 7 and then drying the bonded material. Then, the two bonded materials 9(c), the two bonded materials 9(e) and the two bonded materials 9(f) were bonded into one piece by providing a ceramic fiber-made non-intumescent mat 3 on the side surfaces 21 of the bonded materials 9(c) and at the spaces between the side surfaces 25 of 9(e) and 9(f) and using a double sided tape, to obtain a honeycomb structure shown in FIG. 12(a). The same ceramic fiber-made non-intumescent mat as mentioned above was wound around the outermost peripheral surface 23 of the honeycomb structure 1; the resulting material was stuffed in a SUS 409-made metallic container using a tapered jig, to compression-fix the segments to each other and also the honeycomb structure to the metallic container, to obtain a cylindrical honeycomb structure assembly having a diameter of 144 mm and a length of 152 mm.

The effects of the above Examples were evaluated in comparison with the following two conventional samples (Comparative Examples).

COMPARATIVE EXAMPLE 1

Figure 13A:
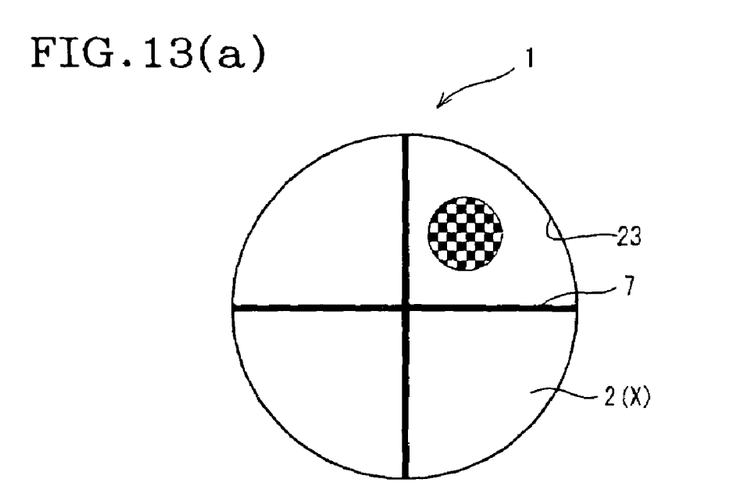
FIGS. 13(a) and 13(b) are each a schematic top view of the honeycomb structure produced in Comparative Example.

Four honeycomb segments 2(x) which had a shape of ¼ of a cylinder having a diameter of 144 mm and a length of 152 mm and which had a fan-like section, were bonded into one piece using an adhesive 7 which was a mixture of colloidal silica, an alumina fiber and water, and then dried, to obtain a honeycomb structure 1 having a diameter of 144 mm and a length of 152 mm, shown in FIG. 13(a). The ceramic fiber-made non-intumescent mat was wound around the outermost peripheral surface 23 of the honeycomb structure; the resulting material was stuffed in a SUS 409-made metallic container using a tapered jig, to compression-fix the honeycomb structure to the metallic container, to obtain a honeycomb structure assembly.

COMPARATIVE EXAMPLE 2

Figure 13B:
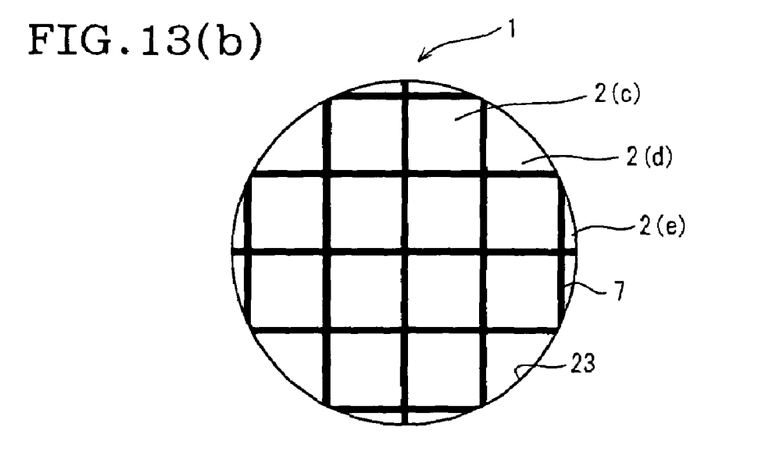

Twenty four honeycomb segments in total, i.e., twelve quadratic prism-shaped honeycomb segments 2(c) having a size of 30 mm×30 mm×152 mm, four honeycomb segments 2(d) and eight honeycomb segments 2(e) were bonded into one piece using the above-mentioned adhesive 7 and dried, to obtain a cylindrical honeycomb structure having a diameter of 144 mm and a length of 152 mm, shown in FIG. 13(b). The ceramic fiber-made non-intumescent mat was wound around the outermost peripheral surface 23 of the honeycomb structure; the resulting material was stuffed in a SUS 409-made metallic container using a tapered jig, to compression-fix the honeycomb structure to the metallic container, to obtain a honeycomb structure assembly.

Each of the thus-obtained honeycomb structure assemblies of Examples 1 to 5 and Comparative Examples 1 to 2 was allowed to trap 15 g of particulate (hereinafter referred to as soot) discharged from a diesel engine. The soot deposited on the filter was burnt using an exhaust gas of 700° C. (inlet temperature), 10% oxygen concentration and 0.7 Nm$^3$/min (flow rate), then the honeycomb structure was observed. When there was no breakage of the honeycomb structure, the amount of soot trapped was increased by 5 g unit to 20 g, 25 g or the like; and the test was repeated until there appeared breakage of the honeycomb structure.

Figure 14:
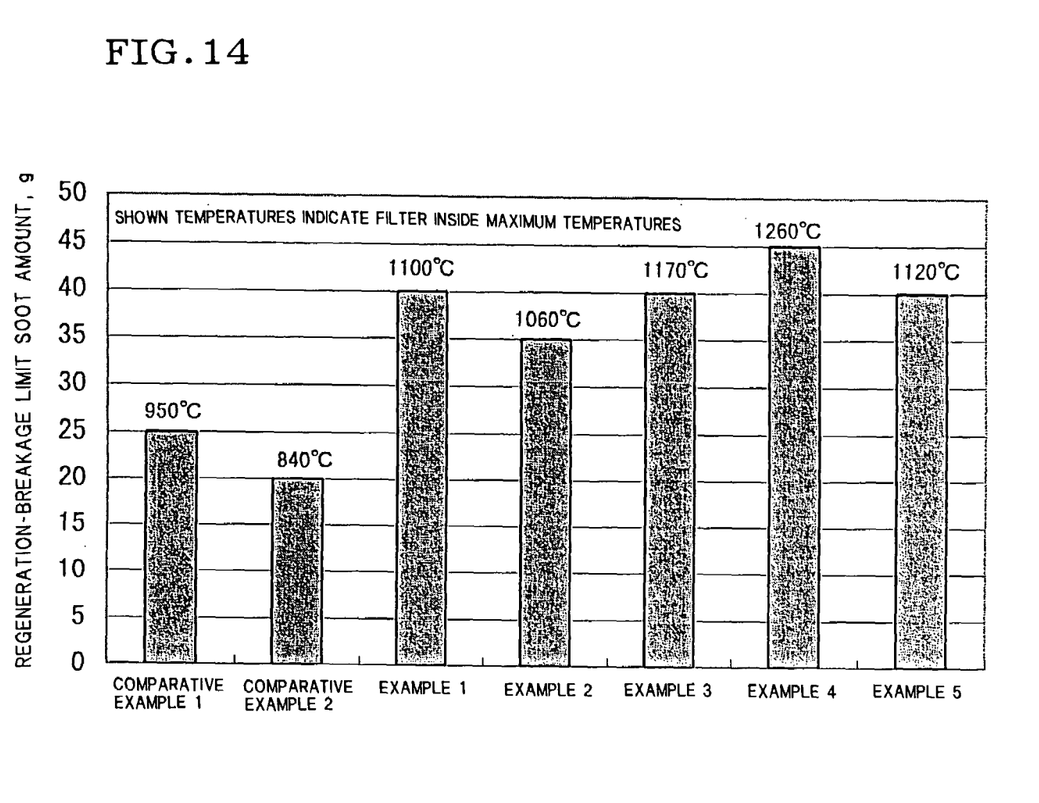
FIG. 14 is a graph showing the result of a test for evaluation of breakage limit.

The test results are shown in FIG. 14. In Comparative Examples 1 and 2, the breakage limit soot amounts were 25 g and 20 g, respectively, and the filter inside maximum temperatures at these amounts were 950° C. and 840° C., respectively. Meanwhile, in Examples 1 to 5, the breakage limit soot amounts were 35 to 45 g and the filter inside maximum temperatures at these amounts were 1,060 to 1,260° C. The honeycomb structures and assemblies thereof, of the present invention, as compared with those of Comparative Examples, showed that they could be used safely up to large soot amounts and high temperatures.

INDUSTRIAL APPLICABILITY

As described above, in the honeycomb structure and honeycomb structure assembly of the present invention, a material A having compressive elasticity is provided between the side surface of at least one honeycomb segment that is not constituting the outermost peripheral surface of the honeycomb structure and honeycomb segments adjacent to the at least one honeycomb segment; therefore, breakage of the honeycomb structure can be prevented at larger soot amounts and higher temperatures, and superior durability and reliability could be shown.

The invention claimed is:

1. A honeycomb structure obtained by bonding, into one piece, a plurality of honeycomb segments having a plurality of passages surrounded by cell walls and extending in the axial direction of the segment, wherein a material A having compressive elasticity is provided in an unbonded space between a side surface of at least one honeycomb segment that is not constituting the outermost peripheral surface of the honeycomb structure and a side surface of the honeycomb segment adjacent to the at least one honeycomb segment.

2. A honeycomb structure according to claim 1, wherein a material having compressive elasticity is provided at part or the whole of the space between two adjacent honeycomb segments constituting the outermost peripheral surface of the honeycomb structure.

3. A honeycomb structure according to claim 1, wherein the material A having compressive elasticity is a ceramic fiber-made mat.

4. A honeycomb structure according to claim 2, wherein the material A having compressive elasticity is a ceramic fiber-made mat.

5. A honeycomb structure according to claim 3, wherein the ceramic fiber-made mat is a non-intumescent mat composed mainly of alumina or mullite.

6. A honeycomb structure according to claim 4, wherein the ceramic fiber-made mat is a non-intumescent mat composed mainly of alumina or mullite.

7. A honeycomb structure according to claim 1, wherein the honeycomb structure is an exhaust gas purification filter of an automobile.

8. A honeycomb structure according to claim 1, wherein the honeycomb structure is a filter that traps diesel particulate.

9. A honeycomb structure according to claim 1, wherein the main component of the honeycomb segment comprises (1) at least one kind of ceramic selected from the group consisting of silicon carbide, silicon nitride, cordierite, alumina, mullite, zirconia, zirconium phosphate, aluminum titanate, titania or combinations thereof, and (2) Fe—Cr—Al, nickel, or metallic Si and SiC.

10. A honeycomb structure assembly comprising:
a metallic container,
a honeycomb structure, obtained by bonding, into one piece, a plurality of honeycomb segments each having a plurality of passages surrounded by cell walls and extending in the axial direction of the segment, wherein a material A having compressive elasticity is provided in an unbonded space between a side surface of at least one honeycomb segment that is not constituting the outermost peripheral surface of the honeycomb structure and a side surface of the honeycomb segment adjacent to the at least one honeycomb segment, and a material B having compressive elasticity, wherein the material B having compressive elasticity is provided on the outermost peripheral surface of the honeycomb structure in a compressed state and thereby the honeycomb structure is compression-held in the metallic container.

11. A honeycomb structure assembly according to claim 10, wherein the material B having compressive elasticity is a ceramic fiber-made mat.

12. A honeycomb structure assembly according to claim 11, wherein the ceramic fiber-made mat is a non-intumescent mat composed mainly of alumina or mullite.

13. A honeycomb structure assembly according to claim 11, wherein the ceramic fiber-made mat is a heat-intumescent mat containing vermiculite.

14. A honeycomb structure assembly according to claim 10, wherein the honeycomb structure assembly is a canned structure including one of a stuffed can structure, a tourniquet can structure, a clamshell can structure or a swaged can structure.

15. A honeycomb structure assembly according to claim 10, wherein the honeycomb structure assembly comprises the metallic container accommodating catalyst-loaded honeycomb segments.

16. A honeycomb structure assembly according to claim 10, wherein the honeycomb structure assembly comprises honeycomb segments accommodated in the metalliccontainer, the interior of the metallic container and the honeycomb segments being loaded with a catalyst.

* * * * *